United States Patent Office 3,694,315
Patented Sept. 26, 1972

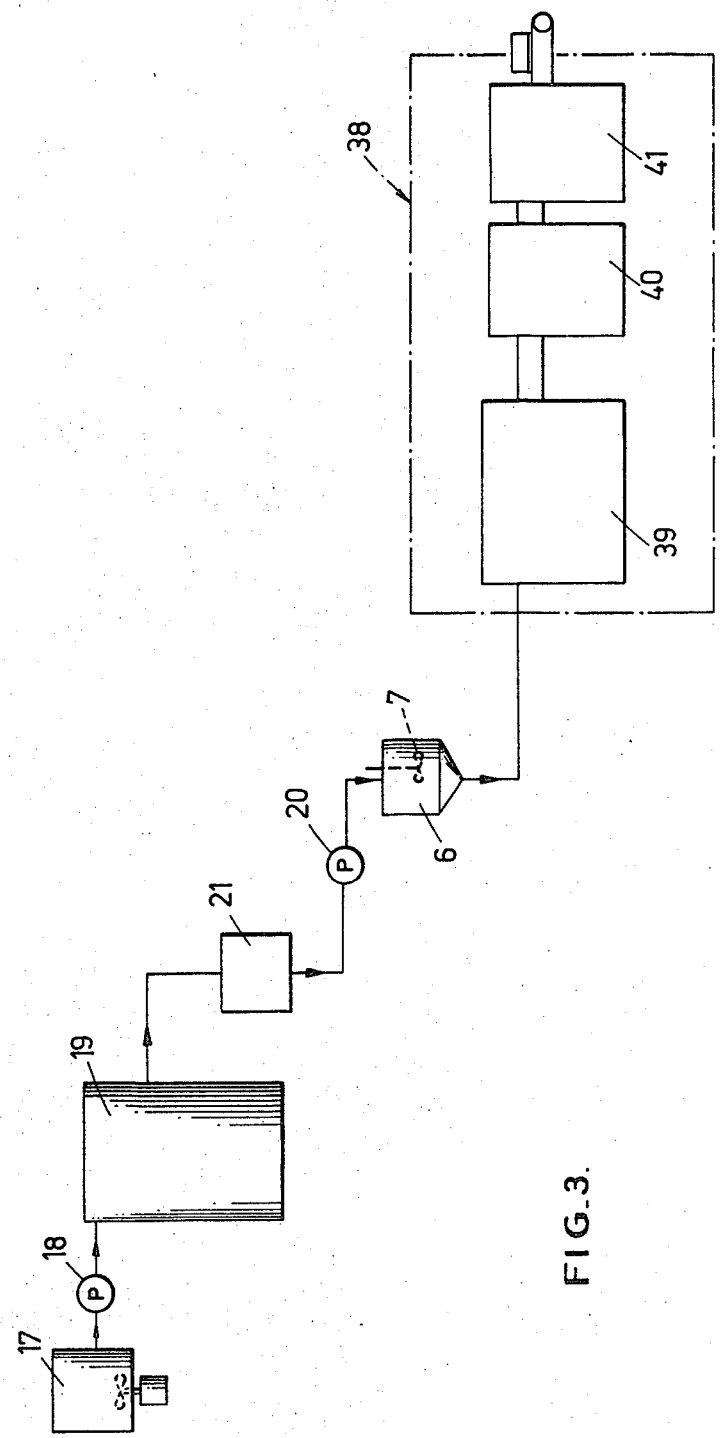

3,694,315
METHOD FOR PROCESSING PAPAW LATEX (PAPAYA) TO OBTAIN PAPAIN
Roger L. Boudart, 45 Avenue d'Italie, Ixelles, Belgium
Filed Nov. 4, 1968, Ser. No. 773,238
Claims priority, application Great Britain, Nov. 10, 1967, 51,232/67
Int. Cl. C07g 7/022
U.S. Cl. 195—66 R                                          12 Claims

ABSTRACT OF THE DISCLOSURE

A method for processing the fresh latex extracted from the papaw fruit to obtain papain comprising centrifuging the fresh latex to separate it from its natural biochemical and biological impurities, the latex being present after centrifugation in at least two phases, a solid phase and a liquid phase, at least the liquid phase then being further processed in order to obtain powered papain, is disclosed.

---

The present invention has for its object a method for processing the latex extracted from papaw fruits (*Carica papaya*) in order to obtain papain.

Up to the present, the latex extracted from the papaw was dried at the site of extraction, e.g. on hurdles at ambient temperature or else in heated premises. After drying, the latex in the shape of granules was shipped to refining centres where it was processed according to different methods in order to obtain the papain. This method of operation offers different disadvantages, the principal one of which is the fact that, for a given quantity of latex, the quantity of papain obtained is fairly low, the proteolytic activity of the latter being also fairly low.

The invention has for its object to overcome these disadvantages and to provide a method making it possible to obtain, at the sites of extraction of the latex and for a given quantity of latex, a quantity of papain definitely exceeding that obtained by current methods, the purity, the proteolytic activity and the solubility of the papain obtained by the method according to the invention being also higher than those of the papain obtained by refining the latex in the shape of granules. The method according to the invention also offers the advantage of permitting either the physical purification, or the refining of the fresh latex in a sequence of operations carried out at the site of extraction of the latex, so as to avoid the intermediate stages of the older methods, such as drying the latex, grinding and liquefying the latex granules and which results in a reduction of the cost price of the papain by curtailment of labour charges and by saving in transport costs.

For that purpose, according to the present invention, the method consists, after extracting the latex from the fruits, in centrifuging the fresh latex in order to separate it from its natural biochemical and biological impurities, the latex being present in three phases, a solid phase, termed insoluble matter of the centrifuge bottle, a liquid phase and an overfloating solid phase, at least the said liquid phase being processed in order to obtain powdered papain.

According to an alternative embodiment of the method according to the invention, the said method consists, after extracting the latex, in evaporating at least part of the liquid contained in the latter, the concentrate obtained being then atomized in order to obtain powdered papain.

The invention has also for its object a plant for working the said method.

According to the invention, the plant comprises a centrifuge allowing the separation of the fresh latex, extracted from the papaw fruits, from its natural biochemical and biological impurities.

According to another mode of embodiment of the invention, the plan comprises an evaporator wherein is introduced the latex after the extraction thereof and an atomizer wherein the concentrate originating from the said evaporator is dried to powder form.

The invention has further for its object the papain obtained by the said method and by means of the said plant.

Other details and features of the invention will become apparent from the description of the drawings attached to the present specification, which illustrate the said method and which represent, by way of nonlimiting examples, two particular forms of embodiment of the plant according to the invention.

FIGS. 2 and 3 are views similar to that of FIG. 1, illustrating alternative embodiments of the plant shown in the said FIG. 1.

In the different figures the same numerical references refer to identical elements.

Figure 1:
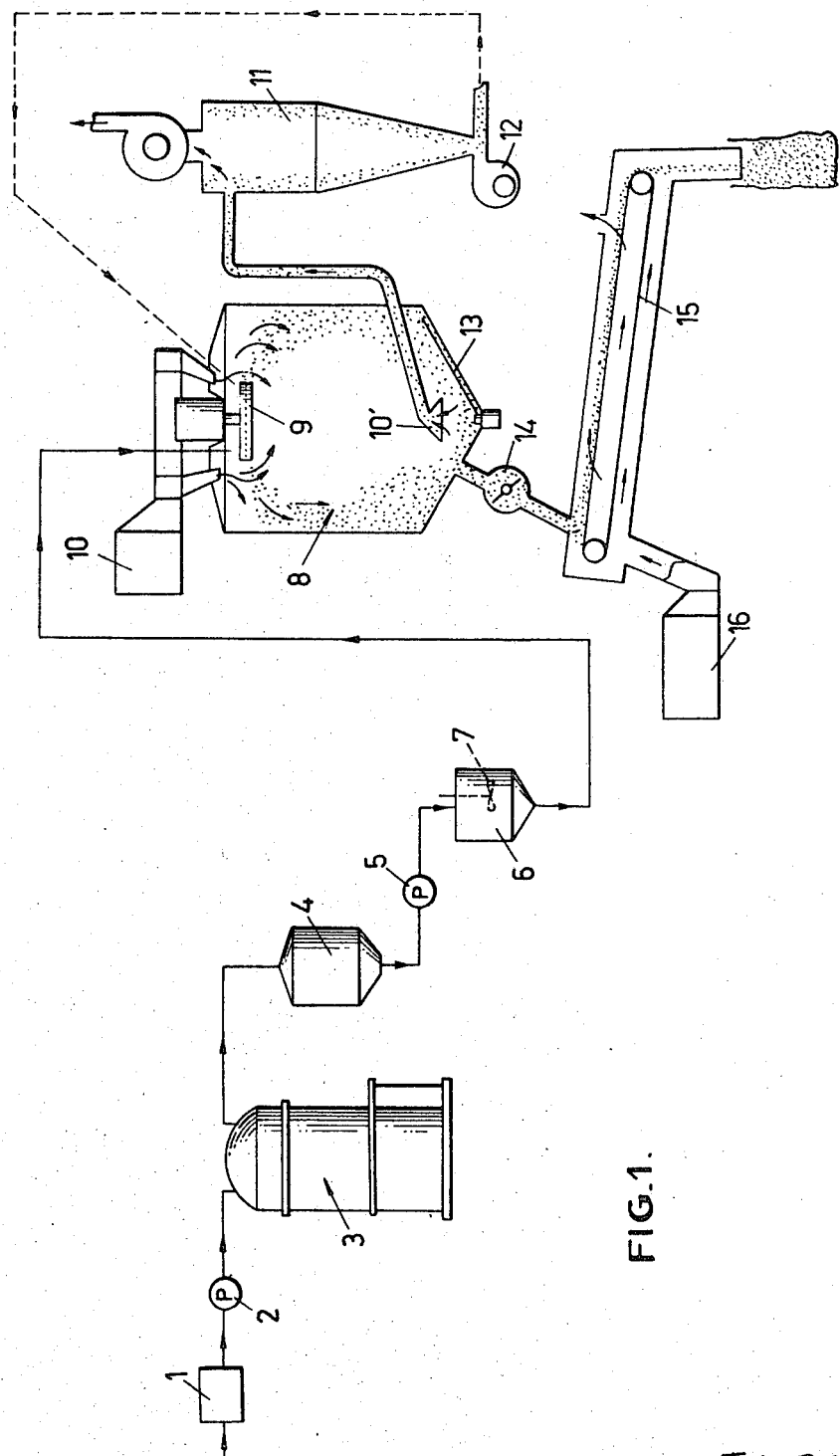
FIG. 1 shows a diagrammatic, elevational view of a plant for processing papaw latex.

According to the invention, the method of processing the latex extracted from the papaw fruits (*Carica papaya*) in order to obtain the papain comprises, after extraction of the latex, filtering the latter and evaporating at least part of the liquid contained in the latex, the concentrate thus obtained being cooled and being then atomized in order to obtain powdered papain, of high proteolytic activity, the powder being cooled at the outlet from the atomizer.

The advantages of the said method will be clearly evidenced by the example given hereinafter.

With the old methods, 5,000 kgs. of fresh latex yield, after drying at ambient temperature or in heated premises, about 1,000 kgs. of granules. After refining the granules, about 550 to 600 kgs. of pure papain with a proteolytic activity of about 650 W.P.A. units (Wallerstein Proteolytic Activity) computed for the dry material, are obtained. The refined papain extracted from the papaw latex thus represents about 10 to 12% by weight of the processed fresh latex.

By the said method according to the invention the quantity of papain obtained represents about 20% by weight of the processed fresh latex, the extracted papain having a proteolytic activity of about 800 W.P.A. units computed for the dry material. The papain obtained by such method cannot, however, be used for specific applications for which fully soluble papain containing a limited number of bacteria is called for.

According to the invention and in order, on the one hand, to obtain a larger quantity of soluble papain than the quantity of soluble papain obtained by evaporation and atomization and, on the other hand, to obtain a papain containing a limited number of bacteria, the latex, after extraction thereof from the fruits, is liquefied in order that it may be conveyed, in the liquid form, so that it shall be subjected to the subsequent steps of the process. The liquefied latex is centrifuged in order to separate the natural biochemical and biological impurities therefrom. The centrifugation separates the latex into three phases: a solid phase, termed insoluble matter of the centrifuge bottle, an overfloating solid phase comprising the natural insoluble impurities and a liquid phase nearly completely free of the said impurities and of the insoluble latex components. After centrifuging, the liquid phase is filtered in order to remove the last fractions of insoluble components from the latex, such liquid phase being subsequently atomized in order to obtain powdered papain. The said solid phase, i.e. the soluble matter, is advantageously subjected to successive washings combined with a kneading operation, such washings being carried out with demineralized water, and to a centrifuging, the liquid phase obtained in the course of the latter being subsequently filtered and then atomized in order to obtain powdered papain. The powdered papain is cooled on leaving the atomizer and then packed, either in vacuo or in an inert gas.

According to the invention, always in order, on the one hand, to obtain a larger quantity of soluble papain than the quantity of soluble papain obtained by evaporation and atomization and, on the other hand, to obtain a papain containing a limited number of bacteria, the latex, after the extraction thereof from the fruits and in the fresh condition is liquefied in order that it may be easily conveyed through pipe lines, centrifuged in order to separate it from its natural biochemical and biological impurities and in order to separate it into three phases, a liquid phase, a solid phase or insoluble matter of the centrifuge bottle and an overfloating solid phase containing the said impurities. The liquid phase is subsequently filtered prior to lyophilization. The insoluble matter is advantageously processed so as to extract likewise pure papain therefrom.

The quantity of soluble papain obtained by centrifuging and atomization or lyophilzation is about 17% by weight of processed latex, the quantity of insoluble papain being about 3% by weight of the said processed latex, such papain having a proteolytic activity of about 1400 W.P.A. units computed for the dry material. The excellent solubility of the papain obtained results from the elimination of the insoluble components of the latex in the course of the said centrifuging and filtration operations, the latter also making it possible to reduce the quantity of bacteria contained in the papain to a considerable extent.

According to the invention the plant, shown in FIG. 1, comprises, at least one filter 1 through which the fresh latex to be processed is drawn by a feed pump 2 into an evaporator 3, such as an evaporator with a high rate of thermal transmission wherein the liquid to be processed is brought into contact with the heating surface for a very brief period of time, this evaporator being designed for processing highly thermo-sensitive products of which the said latex is one. After going through the evaporator 3, the concentrate obtained passes into a cooler 4 and is delivered, through a pump 5, to a tank 6, provided, if need be, with a stirrer 7, feeding an atomizer 8, such as an atomizing disk atomizer 9 comprising a heating battery 10, an exhaust hood for the fines 10', a cyclone 11 and a recycling fan 12 for the fines, the powdered papain being withdrawn from the atomizer by a scraper 13 and delivered to the sacking post through a powder delivery lock 14 and by means of a conveyor 15 ventilated, for cooling the powder, by dry cooling air originating from a fan and an air cooling battery 16.

Figure 2:
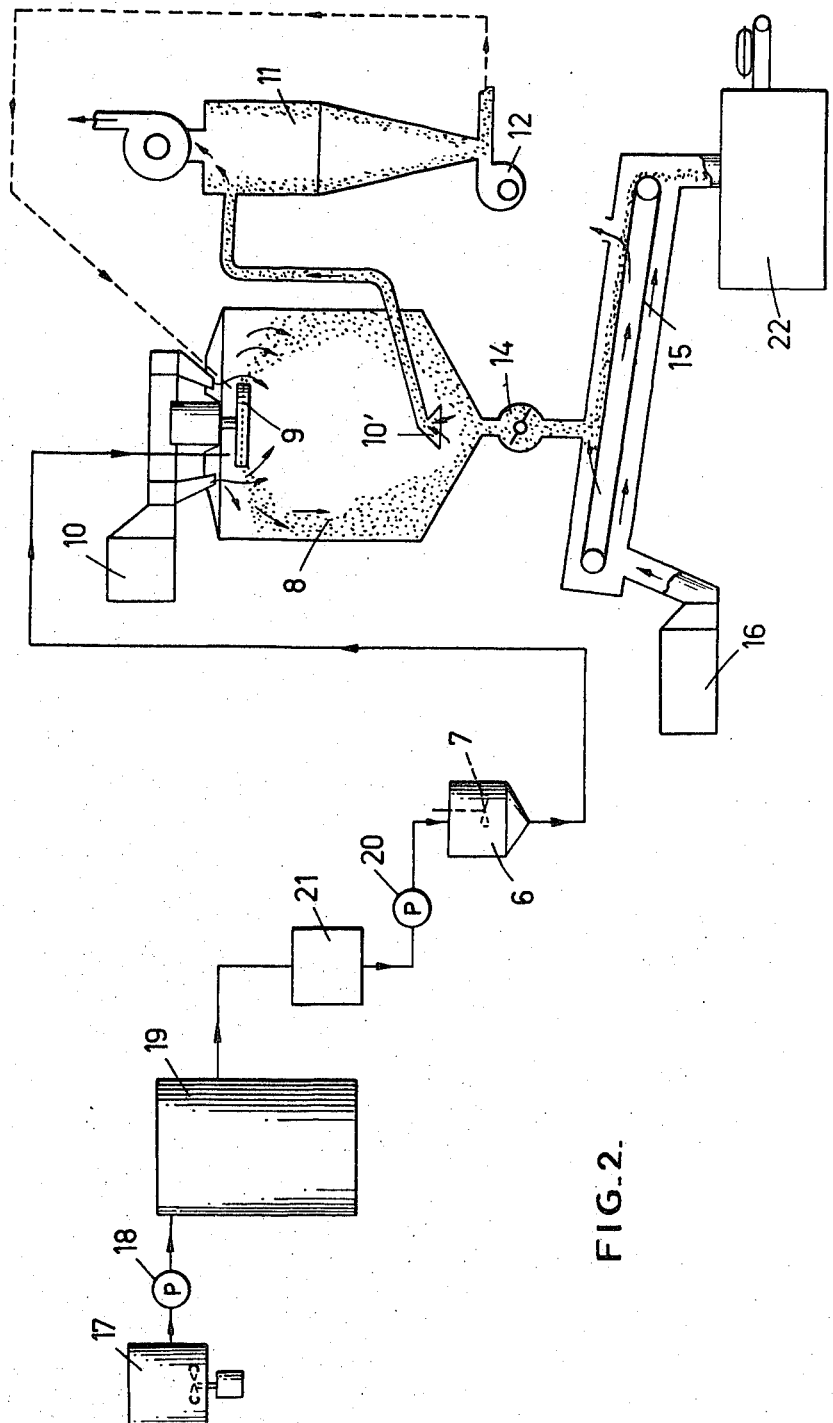

According to the invention, the plant, shown in FIG. 2, comprises a mixer 17 wherein is introduced, for liquefaction, the fresh latex after the extraction thereof from the papaw fruits. The liquefied latex is transferred from the mixer 17, by means of a pump 18, to a centrifuge 19, wherein the latex is separated, on the one hand, from its natural bio-chemical and biological impurities and, on the other hand, into three phases. After passing through the centrifuge 19, the liquid phase of the latex is pumped by a pump 20 through a filter 21 or a battery of filters 21, in order to be stored in a supply tank 6, if need be, provided with a stirrer 7, an atomizer 8, such an atomizing disk atomizer 9 comprising a heating battery 10, an exhaust hood for the fines 10', a cyclone 11 and a recycling fan 12 for the fines. The powdered papain is conveyed to a machine 22 for packing in vacuo or in an inert gas, through a powder delivery lock 14 and by means of a conveyor 15, ventilated for cooling the powder by dry cooling air originating from a fan or from an air-cooling battery 16.

The insoluble matter is processed in the mixer 17 to which is supplied the washing water. After washing and kneading of the insoluble matter in the mixer, the said insoluble matter is conveyed to the centrifuge 19 from where its liquid phase is processed in the same manner as hereinbefore described.

According to the invention, the plant for working the said method shown in FIG. 3 comprises a mixer 17 wherein is introduced the fresh latex in order to be liquefied. The liquefied latex is transferred from the mixer 17, by means of a pump 18, to a centrifuge 19 wherein the latex is separated into three phases, a solid phase, a liquid phase and an overfloating solid phase containing the natural biological and biochemical impurities of the latex. The said liquid phase, on leaving the centrifuge 19 is pumped by a pump 20 through one or a plurality of filters 21, in order to be stored in a supply tank 6, if need be, provided with a stirrer 7, a lyophilization set 38, such set comprising a freezer 39, a machine 40 wherein the ice contained in the frozen product is sublimated and a vessel 41 wherein the lyophilized product is conditioned, either in vacuo or in an inert dry gas.

It will be understood that the invention is in no way limited to the described forms of embodiment and that many changes may be made to the latter without departing from the scope of the present patent application.

I claim:

1. A method for processing the fresh latex extracted from papaw fruits (*Carica papaya*) in order to obtain papain which comprises, after extraction of the fresh latex from the fruits, liquifying by mixing said fresh latex, centrifuging the liquified fresh latex in order to separate it from its natural biochemical and biological impurities, after centrifugation the latex being present in at least two phases, a solid phase, termed insoluble matter of the centrifuge bottle, and a liquid phase, at least the said liquid phase being further processed, said further processing being atomization or lyophilization, in order to obtain powdered papain.

2. A method as claimed in claim 1, wherein the said liquid phase is atomized in order to obtain powdered papain.

3. A method as claimed in claim 1, wherein the said liquid phase is lyophilized in order to obtain powdered papain.

4. A method as claimed in claim 2, wherein the said liquid phase is filtered prior to being atomized.

5. A method as claimed in claim 3, wherein the said liquid phase is filtered prior to being lyophilized.

6. A method as claimed in claim 1, wherein the said insoluble matter of the centrifuge bottle is subjected to successive washings combined with a kneading, the washings being carried out with demineralised water, and subsequently to centrifuge in order to obtain a new liquid phase, said new liquid phase being atomized or lyophilized.

7. A method as claimed in claim 6, wherein said new liquid phase after having been centrifuged is filtered, prior to being either atomized or lyophilized.

8. A method as claimed in claim 2, wherein the powdered papain obtained by atomization is packed in vacuo.

9. A method as claimed in claim 2 wherein the powdered papain obtained by atomization is packed in an inert gas.

10. A method as claimed in claim 4, further comprising evaporating at least a part of the liquid contained in the said liquid phase prior to being atomized.

11. A method as claimed in claim 5, comprising evaporating at least part of the liquid contained in the said liquid phase prior to be lyophilized.

12. A method as claimed in claim 1, wherein said latex, after centrifugation, is present in three phases, the third phase being an overfloating solid phase.

(References on following page)

References Cited

UNITED STATES PATENTS

| | | | |
|---|---|---|---|
| 2,958,632 | 11/1960 | Schwarz | 195—68 |
| 3,104,206 | 9/1963 | Messing | 195—66 |
| 3,141,832 | 7/1964 | Burdick | 195—66 |
| 3,274,072 | 9/1966 | Burdick | 195—66 X |
| 2,694,032 | 11/1954 | Walti | 195—66 |

FOREIGN PATENTS 1,078,838  8/1967  Great Britain.

OTHER REFERENCES

Burdick: "Chemurgic Digest," vol. 16 (7), pp. 4–6, 12 (1957).

Naturwissenschaften, vol. 51 (5), pp. 109–110 (1964).

LIONEL M. SHAPIRO, Primary Examiner